United States Patent
Sassi et al.

(10) Patent No.: US 9,888,317 B2
(45) Date of Patent: Feb. 6, 2018

(54) AUDIO CAPTURE WITH MULTIPLE MICROPHONES

(71) Applicant: Nokia Technologies Oy, Espoo (FI)

(72) Inventors: Antti Heikki Tapio Sassi, Pirkkala (FI); Jari Petteri Sjoberg, Kangasala (FI); Ari Juhani Koski, Lempäälä (FI); Anu Huttunen, Tampere (FI); Mari Partio, Pirkkala (FI); Riitta Niemisto, Tampere (FI); Jukka Vartiainen, Tampere (FI); Ville Mikael Myllyla, Tampere (FI); Jorma Makinen, Tampere (FI); Tero Takala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 256 days.

(21) Appl. No.: 14/515,039

(22) Filed: Oct. 15, 2014

(65) Prior Publication Data
US 2015/0172811 A1 Jun. 18, 2015

Related U.S. Application Data

(60) Provisional application No. 61/894,009, filed on Oct. 22, 2013.

(51) Int. Cl.
- *A61F 11/06* (2006.01)
- *H04R 3/00* (2006.01)
- *H04M 1/60* (2006.01)
(Continued)

(52) U.S. Cl.
CPC .......... *H04R 3/002* (2013.01); *H04M 1/6008* (2013.01); *H04M 1/6041* (2013.01);
(Continued)

(58) Field of Classification Search
CPC .... H04R 3/002; H04R 3/005; H04R 2410/00; H04R 2410/01; H04R 2410/05;
(Continued)

(56) References Cited

U.S. PATENT DOCUMENTS

| 2009/0034752 A1* | 2/2009 | Zhang | H04R 3/005 |
| | | | 381/92 |
| 2009/0190769 A1 | 7/2009 | Wang et al. | |

(Continued)

FOREIGN PATENT DOCUMENTS

| CN | 201491082 U | 5/2010 |
| CN | 201639630 U | 11/2010 |

(Continued)

OTHER PUBLICATIONS

Extended European Search Report received for corresponding European Patent Application No. 14189486.5, dated Apr. 13, 2015, 8 pages.

*Primary Examiner* — William A Jerez Lora
(74) *Attorney, Agent, or Firm* — Harrington & Smith

(57) ABSTRACT

An apparatus including at least one processor and at least one memory including computer program code configured to: when the apparatus is in a voice phone call mode of sound capture, output a signal from a first microphone as a primary speech signal, and select one or more second microphones to output a noise reduction signal, where the apparatus comprises at least two of the second microphones, and where selection of the one or more second microphones is based at least partially upon a determined use of the apparatus being either a handportable or an integrated handsfree use; and/or when the apparatus is in a multi-media mode of sound capture select one or more of the microphones to output audio signals based upon both a determined type of sound capture feature being used by the apparatus and based upon a determined orientation of the apparatus.

21 Claims, 4 Drawing Sheets

(51) Int. Cl.
  *H04M 1/725*    (2006.01)
  *G10L 21/0216*  (2013.01)
(52) U.S. Cl.
  CPC .... *H04R 3/005* (2013.01); *G10L 2021/02165* (2013.01); *H04M 1/72569* (2013.01); *H04R 2410/05* (2013.01); *H04R 2499/11* (2013.01); *H04S 2400/15* (2013.01)
(58) Field of Classification Search
  CPC ............. H04R 2499/11; H04S 2400/00; H04S 2400/15; H04M 1/6008; H04M 1/6041; H04M 1/72569; G10L 2021/02165
  USPC ......... 381/26, 71.1, 80, 81, 85, 91, 92, 94.1, 381/94.7, 111, 123, 124, 375
  See application file for complete search history.

(56) References Cited

U.S. PATENT DOCUMENTS

| | | | |
|---|---|---|---|
| 2010/0081487 A1* | 4/2010 | Chen | G10L 21/0208 455/575.1 |
| 2010/0195838 A1 | 8/2010 | Bright | |
| 2012/0019689 A1* | 1/2012 | Zurek | H04R 3/005 348/240.99 |
| 2012/0128175 A1* | 5/2012 | Visser | H04R 3/005 381/92 |
| 2012/0284619 A1 | 11/2012 | Myllyla et al. | |
| 2013/0272540 A1 | 10/2013 | Ahgren et al. | |
| 2013/0289368 A1* | 10/2013 | Covington | A61B 1/041 600/302 |
| 2013/0332156 A1* | 12/2013 | Tackin | H04M 1/6041 704/226 |
| 2014/0071221 A1* | 3/2014 | Dave | H04M 1/03 348/14.02 |
| 2016/0173976 A1* | 6/2016 | Podhradsky | H04R 3/005 381/92 |

FOREIGN PATENT DOCUMENTS

| | | |
|---|---|---|
| CN | 201717913 U | 1/2011 |
| CN | 102624961 A | 8/2012 |
| WO | 2010/014074 A1 | 2/2010 |

* cited by examiner

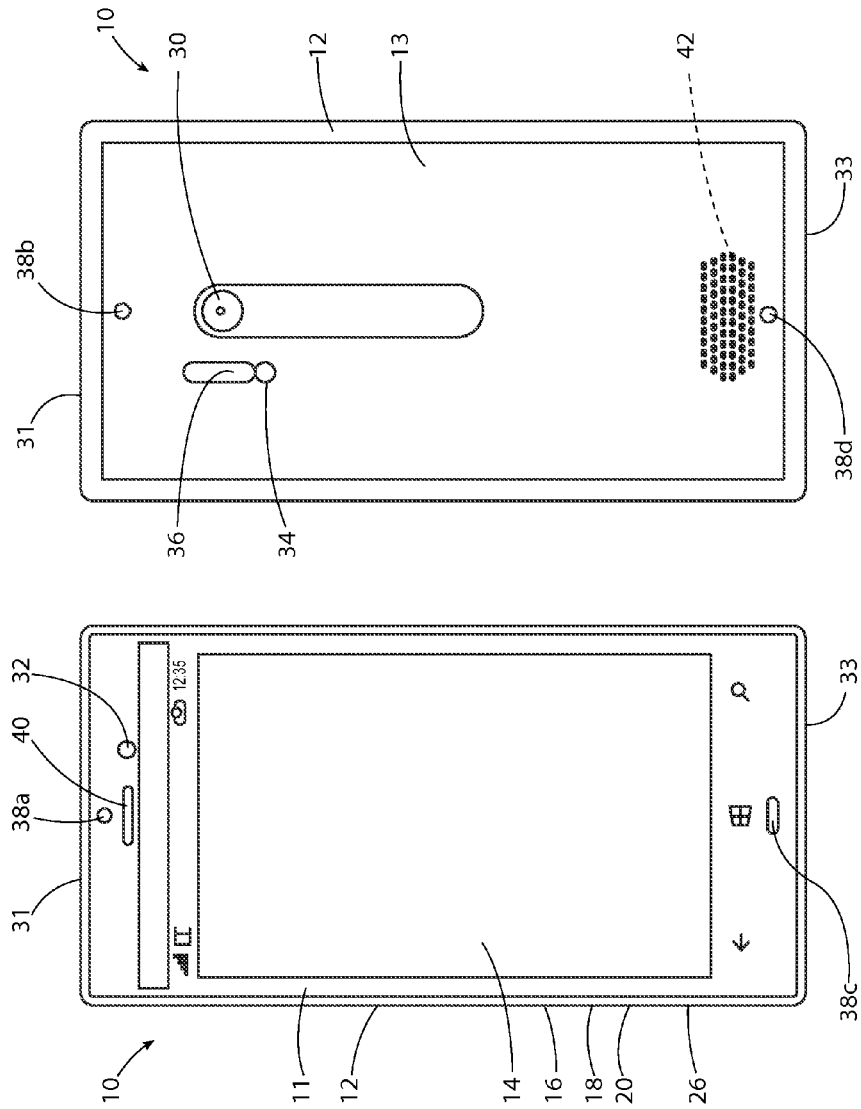

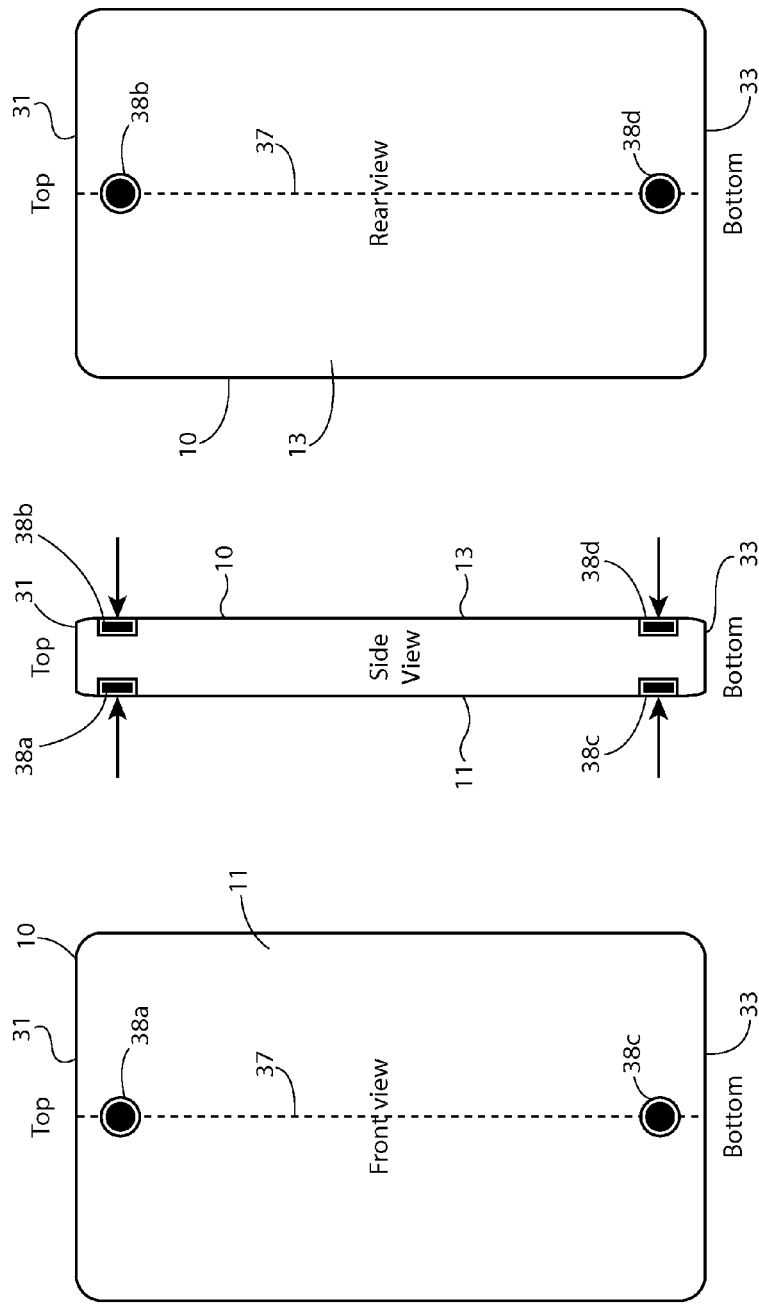

AUDIO CAPTURE WITH MULTIPLE MICROPHONES

BACKGROUND

Technical Field

The exemplary and non-limiting embodiments relate generally to audio and, more particularly, to using of different microphones of an apparatus for different use cases.

Brief Description of Prior Developments

Mobile telephone handsets are known which have multiple microphones.

SUMMARY

The following summary is merely intended to be exemplary. The summary is not intended to limit the scope of the claims.

In accordance with one aspect, an example embodiment is provided in an apparatus comprising at least one processor; and at least one non-transitory memory including computer program code, the at least one memory and the computer program code configured to, with the at least one processor, cause the apparatus at least to, when the apparatus is configured to transmit a sound source in a voice phone call mode, output at least one signal from at least one first microphone to the at least one processor as a primary speech signal, and output two or more signals from at least two or more second microphones to output a noise reduction signal to the at least one processor; and/or when the apparatus is configured to operate for sound capturing in a multi-media mode, output at least one signal from the same one or more of the first microphones, and two or more signals from the same at least two or more second microphones to the at least one processor.

In accordance with another example, a method comprises, when an apparatus is in a voice phone call mode, outputting a signal from at least one first microphone to the at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more first microphones, and two or more signals from the same at least two or more second microphones to the at least one processor.

In accordance with another aspect, an example embodiment comprises a non-transitory program storage device readable by a machine, tangibly embodying a program of instructions executable by the machine for performing operations, the operations comprising, when an apparatus is in a voice phone call mode, outputting a signal from at least one first microphone to at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more of the first microphones, and two or more signals from the same at least two or more second microphones to the at least one processor.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

FIG. 4A is a schematic front view of the apparatus shown in FIG. 1;

FIG. 4B is a schematic side view of the apparatus shown in FIG. 1;

FIG. 4C is a schematic rear view of the apparatus shown in FIG. 1;

DETAILED DESCRIPTION OF EMBODIMENTS

Figure 3:
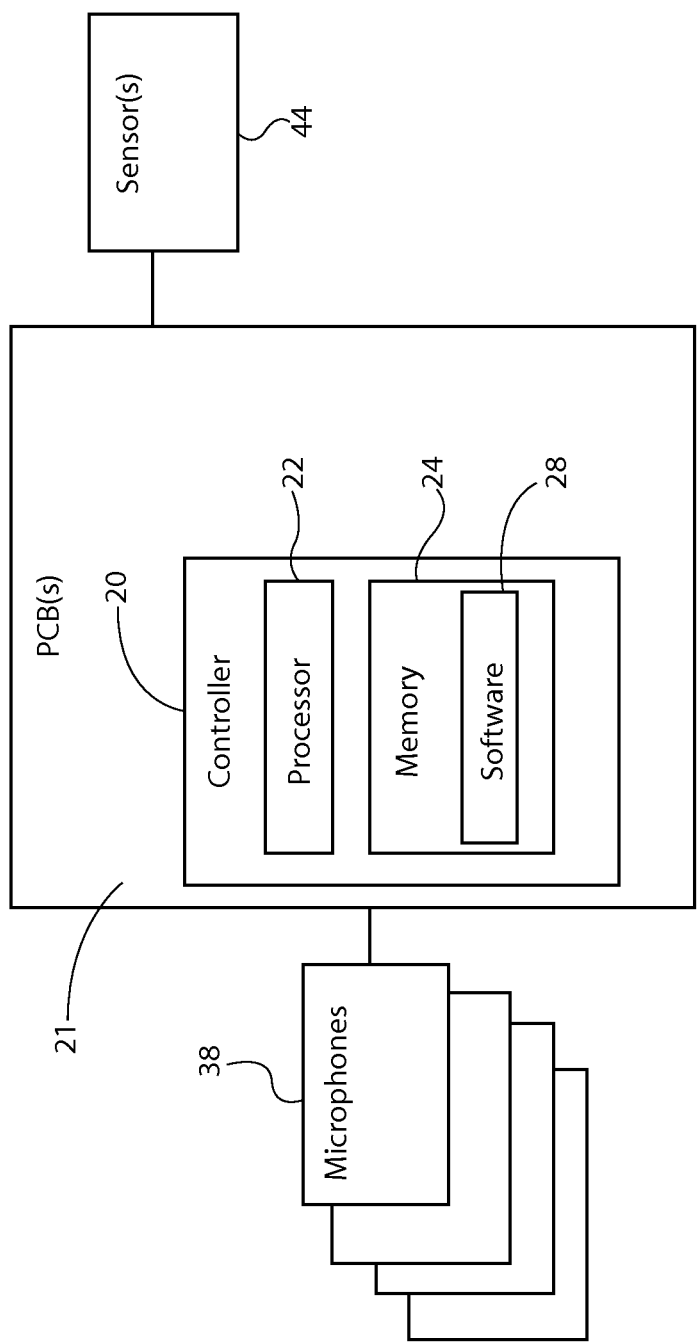
FIG. 3 is a diagram illustrating some of the components of the apparatus shown in FIGS. 1-2.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Referring also to FIG. 2, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The touchscreen 14 is located at a front side 11 of the housing 12. The display 14 in this example is a capacitive touchscreen display which functions as both a display screen and as a user input. The user interface may also include a keypad or other user input device. Referring also to FIG. 3, the controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as an earpiece 40, and a sound transducer provided as a speaker 42. More or less than one speaker may be provided.

The apparatus 10 includes a plurality of sound transducers provided as microphones 38. In this example embodiment the apparatus 10 has four (4) microphones. However, in an alternate embodiment more or less than four microphones may be provided. In this example, the microphones 38 are connected to the PCB 21, which connects the microphones to the controller 20.

Referring also to FIGS. 4A-4C, the apparatus 10 is shown schematically illustrating the general layout of its four microphones 38. The apparatus 10 has a general block shape with the front side 11, the rear side 13, a top 31 and a bottom 33. The four microphones 38 include a front top microphone 38a, a rear top microphone 38b, a front bottom microphone 38c and a rear bottom microphone 38d. In this example the two front microphones 38a, 38c are aligned with a centerline 37 of the apparatus. However, the microphones could be at least partially offset from the centerline. Likewise, the two rear microphones 38b, 38d are aligned with the centerline 37 of the apparatus, but could be at least partially offset from the centerline.

The controller 20 is configured to selectively use the microphones based upon different circumstances and uses of the apparatus 10. Sometimes only one of the microphones might be used. Other times all of the microphones might be used. Features as described herein allow for selective use of different numbers of the microphones and different select ones of the microphones as better understood from the description below.

Features as described herein may be used, for example, with smartphone devices and portable audio devices such as a camera or video recorder. Features may be used with microphone integration for high quality audio capture and advanced communication audio. Features may be used to improve the perceived quality of captured audio and communication audio. Features may be used to optimize product design by cost and component count by providing optimal component locations, and by sharing use of components (microphones) for several use cases.

The example embodiments describe optimal microphone configurations for smartphones where at least 3 or 4 microphones are used for at least two different use cases such as multichannel, stereo and mono audio recording capability and advanced background, wind noise and echo reduction for uplink speech in telephony. The solution optimizes phone ergonomics, usability and recording and voice call performance. The microphone configuration may consist of different microphone pairs (where microphones functions can be shared between different pairs) or microphone groupings (as a combination of a microphone pair and one or more other microphones) that are used to implement different use cases such as directional stereo capture, enhanced handportable (HP) and speakerphone (IHF) calls in combination with conventional and spatial signal processing methods. FIGS. 1-4 is an example of symmetric microphone pairs (a 4-mic configuration).

The example embodiments relate to an integration of at least 3 microphones which are suitably located on an apparatus, such as a mobile phone for example, wherein the microphones provide respective output signals in at least one use case. All microphones are utilized for one or another number of different use cases, such as HandPortable (HP), Integrated HandsFree (IHF) and audio capture for multimedia for example.

When the apparatus 10 is in a voice phone call mode of sound capture, such as during a telephone conversation, the example apparatus 10 is configured to provide different types of uses including handportable (HP) use or integrated handsfree (IHF) use. Handportable (HP) use is when a phone call is being made with the apparatus/phone 10 being held against the ear of the user, where sound is output from apparatus/phone 10 via earpiece 40. Integrated handsfree (IHF) use is when a phone call is being made with the apparatus/phone 10 via the loudspeaker 42. Integrated handsfree (IHF) use includes Hand-held Handsfree (HHHF) use and Desktop Handsfree (DTHF) use call cases. Hand-held Handsfree (HHHF) use is when a phone call is being made with the apparatus/phone 10 while holding phone 10 in a hand of the user, where sound is output via IHF loudspeaker 42. Desktop Handsfree (DTHF) use is when a phone call is being made with the apparatus/phone 10 while the phone 10 is placed on a surface, such as a table for example, where sound is output via IHF loudspeaker 42.

The apparatus 10 is configured to output a signal from a first microphone 38c as a primary speech signal from the user of the apparatus during HP use. When the apparatus 10 is in a voice phone call mode of sound capture the apparatus 10 is configured to determine in which of the different types of uses the apparatus 10 is being used; HP or IHF and perhaps HHHF or DTHF. With this information, the apparatus 10 is configured to select one or more second ones of the microphones 38a, 38b, 38d to output a noise reduction signal to be used by the electronics to reduce noise. Thus, selection of the one or more second microphones 38a, 38b, 38d is based, at least partially, upon a determined use of the apparatus 10 being either a handportable use or an integrated handsfree use. If the use is an integrated handsfree use, the apparatus may be configured to select one or more second microphones 38a, 38b, 38d based, at least partially, upon a determined use of the apparatus 10 being either HHHF or DTHF. Determining if the use is either HP or IHF is relatively simple, such as based upon whether or not the speaker 42 is being used. Typically the user selects the IHF mode (speakerphone) explicitly from the phone call user interface (UI), although it could be done also automatically, e.g. using a proximity sensor or other sensor(s) to determine the phone position. For determining if the use is either HHHF or DTHF the apparatus may use one or more sensors 44 such as an orientation sensor, a motion sensor and/or a touch sensor for example.

With the voice phone call mode of sound capture having been determined, the apparatus 10 is configured to select the microphone(s) 38 to be used for that determined mode of sound capture. For example, for Handportable (HP) uplink noise reduction, the apparatus may select the front bottom microphone 38c and the rear bottom microphone 38d and the rear top microphone 38d to output audio signals, but not the front top microphone 38a (or at least not use any audio signal from the front top microphone 38a). Because the front top microphone 38a might be covered or interfered with by the user's ear, the apparatus 10 is configured to not use this microphone in the HP mode of use. Also, if the sound transducer 40 is also the microphone 38a, then that sound transducer could not be used during a HP mode of use because it needs to be used as an earpiece.

A noise reduction algorithm in the apparatus may be used, with the signals from the three microphones 38c, 38d and 38b to reduce ambient noise pickup of the microphones in the handportable call. This solution may be based on adaptive filtering and use of fixed microphone beam. As another example, for Hand-held speakerphone uplink noise reduction, the apparatus may select the following groups of microphones to output audio signals for noise reduction:

the front top microphone 38*a*, the rear top microphone 38*b* and the front bottom microphone 38*c* (but not the rear bottom microphone 38*d*), or the front bottom microphone 38*c*, the rear bottom microphone 38*d* and the front top microphone 38*a* (but not the rear top microphone 38*b*), or the front bottom microphone 38*c*, the rear bottom microphone 38*d* and the rear top microphone 38*b* (but not the front top microphone 38*a*), or the front bottom microphone 38*c*, the rear bottom microphone 38*d*, the front top microphone 38*a* and the rear top microphone 38*d*.

A noise reduction algorithm in the apparatus may be used, with the signals from the two microphones 38*a* and 38*b* to reduce ambient noise pickup of the microphone in the hand-held speakerphone call. This solution may be based on use of moving beam and adaptive filtering.

As another example, for Desktop speakerphone uplink noise reduction the apparatus may select the following groups of microphones to output audio signals for noise reduction:

the front top microphone 38*a*, the rear top microphone 38*b* and the front bottom microphone 38*c* (but not the rear bottom microphone 38*d*), or the front bottom microphone 38*c*, the rear bottom microphone 38*d* and the front top microphone 38*a* (but not the rear top microphone 38*d*), or the front bottom microphone 38*c*, the rear bottom microphone 38*d* and the rear top microphone 38*b* (but not the front top microphone 38*a*), or the front bottom microphone 38*c*, the rear bottom microphone 38*d*, the front top microphone 38*a* and the rear top microphone 38*b*.

A noise reduction algorithm in the apparatus may be used, with the signals from the sole microphone 38*a* to reduce ambient noise pickup of the microphone in the desktop speakerphone call. This solution may be based on moving beam and adaptive filtering.

As noted above, besides a voice phone call mode of sound capture, the apparatus may be used in a multi-media mode of sound capture, such as when video is being recorded by the camera(s) 30, 32 for example. When the apparatus 10 is in a multi-media mode of sound capture, the apparatus is configured to determine the type of sound capture feature being used by the apparatus. Different types of sound capture features during a multi-media mode of sound capture may comprise, for example, Mono audio capture, Mono Zoom audio capture, stereo capture, directional stereo capture, surround capture and wind noise reduction. Mono audio capture is capture of sound during normal monoaural sound recording without any special features. Mono zoom audio capture is capture of sound during monoaural sound recording, but when the camera 30 has been zoomed. The other features described above (stereo capture, directional stereo capture, surround capture and wind noise reduction) should be understood by a person skilled in the art.

The determination of type of sound capture feature being used by the apparatus during a multi-media mode of sound capture may be based upon user selected settings of the apparatus (such as when Zoom is actuated for example). Once the type of sound capture feature being used by the apparatus during a multi-media mode of sound capture has been determined, the apparatus 10 is configured to select which of the microphone(s) 38 to be used for that determined type of sound capture feature. For example, with the Mono audio capture feature the apparatus 10 may be configured to only select the rear top microphone 38*b* to output an audio signal. Sound may be captured with an omni-directional polar pattern in mono, and sound source directions are not separated.

In the example embodiment shown, in addition to using the determined type of sound capture feature, the selection of which microphones to use may be also based upon at least one other parameter. In this particular example the additional parameter is a determined orientation of the apparatus 10, such as portrait or landscape. The chart below gives some examples of how the apparatus may be programmed to select and use the different microphones for the different features:

| Feature | Orientation | Recommended microphones | Description |
|---|---|---|---|
| Mono | Portrait or Landscape | Rear top 38b | Captures sound with omni-directional polar pattern in mono. Sound source directions are not separated. |
| Mono Zoom | Portrait | Rear top 38b and front top 38a | Captures sound primarily from the direction of video shooting in mono. Attenuates unwanted sounds from opposite and surrounding directions. (Possible improvements for the performance in landscape orientation when using both microphone pairs in top and bottom) |
| | Landscape | Rear top 38b and front top 38a (and rear bottom 38d and front bottom 38c) | |
| Stereo Capture | Landscape | Rear top 38b and Rear bottom 38d | Captures sound with omni-directional polar patterns in stereo. Stereo image depending on, inter alia, the distance between the microphones. |
| | Portrait | N/A | |
| Directional stereo capture | Landscape | Rear top 38b and front top 38a and rear bottom 38d and front bottom 38c | Captures sound with directional polar patterns in stereo. Provides improved front-back separation compared to conventional omni-directional stereo recording reference. |

-continued

| Feature | Orientation | Recommended microphones | Description |
|---|---|---|---|
| | Portrait | N/A | (Possible benefit of the mono zoom in portrait use). |
| Surround capture | Landscape | Rear top 38b and Rear bottom 38d and Front bottom 38c OR Rear top 38b and Front top 38a and Rear bottom 38d | Captures sound in surround by identifying direction of sounds and mapping them into 5.1 speaker configuration. Basic performance depends on the quality of the stereo recording, third microphone defines the directions of the sound sources. |
| | Portrait | N/A | |
| Wind noise reduction | Landscape | Stereo: Rear top 38b and rear bottom 38d mics with (Front top 38a OR front bottom 38c) | Wind noise reduction reduces the wind noise in the recording. Wind noise reduction refers to the use of the microphone switching between the front and rear microphone components (opposite to each other) in combination with high-pass filtering. |
| | Portrait | N/A | |

Thus, during a HP call all four microphones may be selectively used in a following manner:

microphone 38b provides the far field noise reduction noise reference signal microphone 38a is used to form a beam with microphone 38b for more accurate noise reference microphone 38d is used for near field noise reduction algorithm noise reference signal microphone 38c is used for the primary speech signal microphone 38d is used to form a beam with microphone 38c for the primary speech signal Thus, during a IHF call all four microphones may be selectively used in a following manner:

microphone 38d provides a reference signal for the Acoustic Echo Cancelling algorithm (improves echo cancelling/double talk)

This reference signal is much more realistic (natural distortion from the IHF speaker mechanics) than electrical reference signal from amplifier or digital reference from DSP microphone 38c is used for the background noise reference microphone 38b is used for the background noise reference microphone 38a is used for the primary speech signal microphone 38b is used to form a beam with microphone 38a for the primary speech signal Thus, for Video-recording/Audio-capture all four microphones may be selectively used in a following manner:

microphone 38b and microphone 38a form a beam for the Left signal microphone 38d and microphone 38c form a beam for the Right signal microphone 38a or microphone 38c is used for measuring the time difference which enables algorithms to create 5.1/6.1/7.1 multi-channel audio capture The above described example using four (4) suitably positioned microphones may provide:

Stereo and multi-channel audio capture

Beam forming for multiple speech cases and audio capture

Naturally distorted echo reference from the speaker for IHF call Acoustic Echo Cancelling (a microphone should to be placed nearby the speaker sound outlet to pick up the reference signal)

Near and Far field noise references for Ambient noise reduction algorithms (Two different sources for ambient noise gives better starting point for the Background noise reduction algorithm to distinguish the noise from actual speech signal)

For a HP call, features as described herein improve the background noise cancellation (operator requirements) improves user experience because a product's uplink signal contains less of the environmental noise and the voice quality is therefore clearer to understand. Forming a beam for a speech (or noise reference) signal improves the performance in a sense that directivity of the signal becomes greater. With more directivity, the signal is picked up better (the ratio for the wanted signal versus unwanted environmental sound).

For a IHF call, features as described herein improve Acoustic Echo Cancelling providing a better user experience and double talk attenuation. Basically the conversation is more natural for both near-end and far-end users. Features also improve the background noise cancellation (operator requirements) and improve user experience as product's uplink signal contains less of the environmental noise and the voice quality is therefore clearer to understand. Forming a beam for a speech (or noise reference) signal improves the performance in a sense that directivity of the signal is greater. With more directivity, the signal picks up better ratio for the wanted signal versus unwanted environmental sound.

For audio capture during a multi-media mode, features as described herein improve audio capture providing a multi-channel recording where the recorded signal content is enhanced. The recording can be reproduced in multi-channel audio equipment (for example home theater or capable headset) and the playback experience is richer.

Figure 5C:
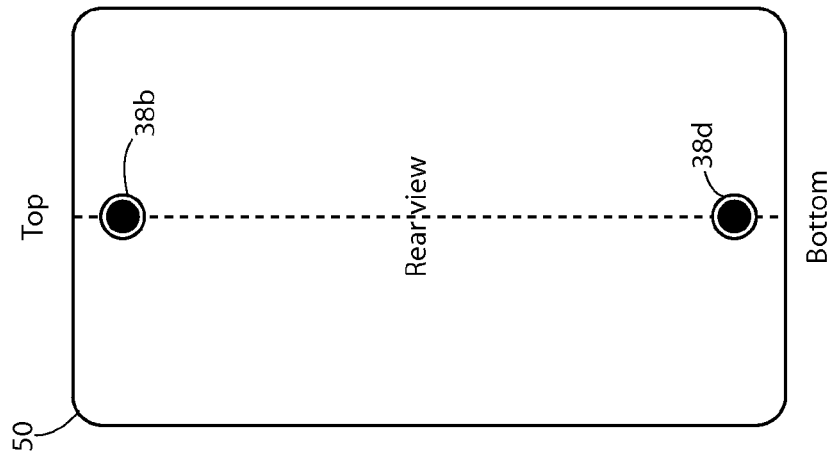
FIG. 5C is a schematic rear view of the apparatus shown in FIG. 5A.
Figure 5B:
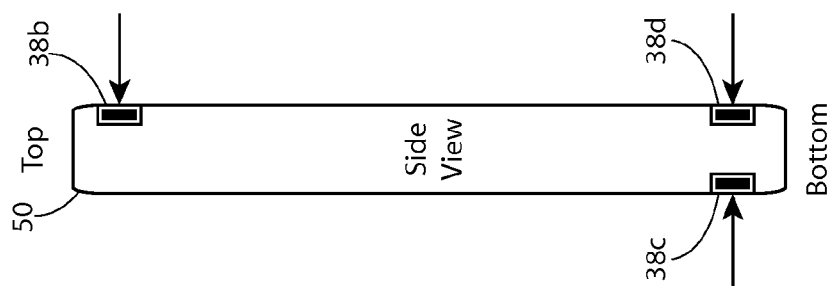
FIG. 5B is a schematic side view of the apparatus shown in FIG. 5A.
Figure 5A:
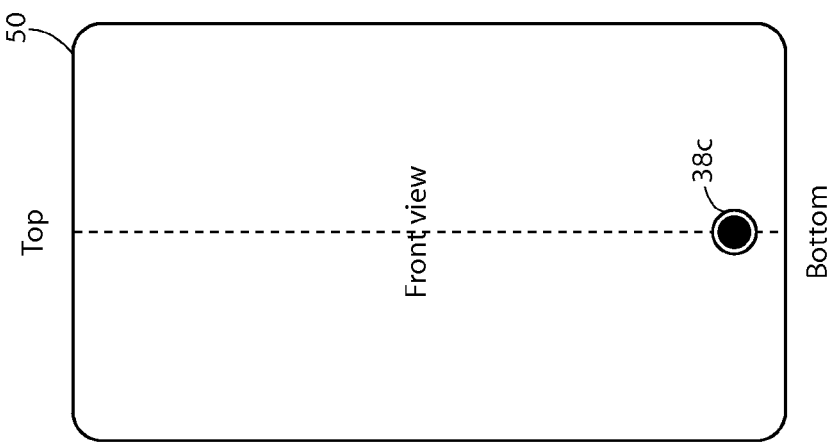
FIG. 5A is a schematic front view of an alternate example of the apparatus shown in FIG. 1.

Referring also to FIGS. 5A-5C, another example embodiment is shown. In this example the apparatus 50 is a smartphone exactly the same as the apparatus 10, but with the difference that only three microphones 38 are provided rather than four microphones. In this embodiment the apparatus comprises the rear top microphone 38b, the front bottom microphone 38c and the rear bottom microphone 38d.

As an example, for Hand-held speakerphone uplink noise reduction, the apparatus may select the following groups of microphones to output audio signals for noise reduction the front bottom microphone 38c, the rear bottom microphone 38d and the rear top microphone 38b. A noise reduction algorithm in the apparatus may be used, with the signals from the two microphones 38a and 38b to reduce ambient noise pickup of the microphone in the hand-held speakerphone call. This solution may be based on use of moving beam and adaptive filtering.

As another example, for Desktop speakerphone uplink noise reduction the apparatus may select the following groups of microphones to output audio signals for noise reduction the rear top microphone 38b, the front bottom microphone 38c and the rear bottom microphone 38d. A noise reduction algorithm in the apparatus may be used, with the signals from the sole microphone 38a to reduce ambient noise pickup of the microphone in the desktop speakerphone call. This solution may be based on moving beam and adaptive filtering.

The chart below gives some examples of how the apparatus 50 may be programmed to select and use the different microphones for the different features during a voice phone call mode of sound capture:

| Feature | Orientation | Recommended microphones | Description |
| --- | --- | --- | --- |
| Mono | Portrait or Landscape | Rear top 38b | Captures sound with omni-directional polar pattern in mono. Sound source directions are not separated. |
| Mono Zoom | Portrait | N/A | |
| | Landscape | Rear bottom 38d and rear top 38b | Captures sound primarily from the direction of video shooting in mono. Attenuates unwanted sounds from opposite and surrounding directions. |
| Stereo Capture | Landscape | Rear top 38b and Rear bottom 38d | Captures sound with omni-directional polar patterns in stereo. Stereo image depending on, inter alia, the distance between the microphones. |
| | Portrait | N/A | |

The chart below gives some examples of how the apparatus 50 may be programmed to select and use the different microphones for the different features during a multi-media mode of sound capture:

| Feature | Orientation | Recommended microphones | Description |
| --- | --- | --- | --- |
| Mono | Portrait or Landscape | Rear top 38b | Captures sound with omni-directional polar pattern in mono. Sound source directions are not separated. |
| Mono Zoom | Portrait | N/A | Captures sound primarily from the direction of video shooting in mono. Attenuates unwanted sounds from opposite and surrounding directions. |
| | Landscape | Rear bottom 38d and rear top 38b | |
| Stereo Capture | Landscape | Rear top 38b and Rear bottom 38d | Captures sound with omni-directional polar patterns in stereo. Stereo image depending on, inter alia, the distance between the microphones. |
| | Portrait | N/A | |
| Directional stereo capture | Landscape | N/A | Captures sound with directional polar patterns in stereo. Provides improved front-back separation compared to conventional omni-directional stereo recording reference. (Possible benefit of the mono zoom in portrait use). |
| | Portrait | N/A | |
| Surround capture | Landscape | Top rear 38b and bottom rear 38d and front bottom 38c | Captures sound in surround by indentifying direction of sounds and mapping them into 5.1 speaker configuration. Basic performance depends on the quality of the stereo recording, third microphone defines the directions of the sound sources. |
| | Portrait | N/A | |
| Wind noise reduction | Landscape | N/A | Wind noise reduction reduces the wind noise in the recording. Wind noise reduction refers to the use of the microphone switching between the front and rear microphone components (opposite to each other) |

-continued

| Feature | Orientation | Recommended microphones | Description |
| --- | --- | --- | --- |
| | | | in combination with high-pass filtering. |
| | Portrait | N/A | |

An example embodiment may be provided in an apparatus comprising at least one processor and at least one non-transitory memory including computer program code, the at least one memory and the computer program code configured to, with the at least one processor, cause the apparatus at least to, when the apparatus is in a voice phone call mode of sound capture, output a signal from a first microphone as a primary speech signal, and select one or more second microphones to output a noise reduction signal, where the apparatus comprises at least two of the second microphones, and where selection of the one or more second microphones is based at least partially upon a determined use of the apparatus being either a handportable use or an integrated handsfree use; and/or, when the apparatus is in a multimedia mode of sound capture, select one or more of the microphones to output audio signals based, at least partially, upon both a determined type of sound capture feature being used by the apparatus, where the apparatus comprises a plurality of different types of sound capture features, and based upon a determined orientation of the apparatus.

When the determined use of the apparatus is the handportable use, the apparatus may be configured to select a front bottom microphone, a rear bottom microphone and a rear top microphone as the selected one or more second microphones. When the determined use of the apparatus is the integrated handsfree use, selection of the one or more second microphones may be based at least partially upon a determined use of the apparatus being either a handheld handsfree use or a desktop handsfree use. When the determined use of the apparatus is the handheld handsfree use, the apparatus may be configured to select a front top microphone and a rear top microphone as the selected one or more second microphones. When the determined use of the apparatus is the desktop handsfree use, the apparatus may be configured to select a front top microphone as the selected one or more second microphones. The determined orientations of the apparatus may comprise a portrait orientation and a landscape orientation. The different types of sound capture features may comprise two of more of: mono audio capture, mono zoom audio capture, stereo capture, directed stereo capture, surround capture and wind noise reduction. When the determined type of sound capture feature is mono audio capture, the apparatus may be configured to select a rear top microphone as the selected one or more microphones, and when the determined type of sound capture feature is mono zoom audio capture, and when the determined orientation is a portrait orientation, the apparatus may be configured to select a rear top microphone and a front top microphone, or a rear bottom microphone and a front bottom microphone, as the selected one or more microphones, and when the determined type of sound capture feature is mono zoom audio capture, and when the determined orientation is a landscape orientation, the apparatus may be configured to select a rear top microphone and a front top microphone, and/or a rear bottom microphone and a front top microphone, as the selected one or more microphones. When the determined type of sound capture feature is stereo capture, and when the determined orientation is a landscape orientation, the apparatus may be configured to select a rear top microphone and a rear bottom microphone as the selected one or more microphones. When the determined type of sound capture feature is directional stereo capture, and when the determined orientation is the landscape orientation, the apparatus may be configured to select the rear top microphone, a front top microphone, the rear bottom microphone and a front bottom microphone as the selected one or more microphones. When the determined type of sound capture feature is surround capture, and when the determined orientation is the landscape orientation, the apparatus may be configured to select a rear top microphone, a front top microphone and a rear bottom microphone as the selected one or more microphones, and/or the rear top microphone, the rear bottom microphone and a front bottom microphone as the selected one or more microphones. When the determined type of sound capture feature is wind noise reduction, and and when the apparatus has four or more microphones, when the determined orientation is the landscape orientation, the apparatus may be configured to select a rear top microphone, a rear bottom microphone and a front top microphone or a front bottom microphone as the selected one or more microphones. The apparatus 10 may comprise means for selectively using microphones based upon a determined type of sound capture feature being used by an apparatus, where the apparatus comprises a plurality of different types of sound capture features, and based upon a determined orientation of the apparatus; and/or a determined mode of use of the apparatus while the apparatus is in a voice phone call mode of sound capture. The apparatus may further comprise a housing; at least one printed circuit board in the housing, where the at least one printed circuit board comprises the at least one processor and the at least one memory; at least one transmitter and at least one receiver connected to the at least one printed circuit board; an electronic display connected to the housing; and a battery connect to the at least one printed circuit board.

An example method may comprise, when an apparatus is in a voice phone call mode of sound capture, outputting a signal from a first microphone as a primary speech signal, and selecting one or more second microphones of the apparatus to output a noise reduction signal, where the apparatus comprises at least two of the second microphones, and where selection of the one or more second microphones is based at least partially upon a determined use of the apparatus being either a handportable use or an integrated handsfree use; and/or, when the apparatus is in a multimedia mode of sound capture, selecting one or more of the microphones to output audio signals based, at least partially, upon both a determined type of sound capture feature being used by the apparatus, where the apparatus comprises a plurality of different types of sound capture features, and based upon a determined orientation of the apparatus.

When the determined use of the apparatus is the handportable use, the method may comprise selecting a front bottom microphone, a rear bottom microphone and a rear top microphone as the selected one or more second microphones. When the determined use of the apparatus is the integrated handsfree use, the method may comprise selecting the one or more second microphones based at least partially upon a determined use of the apparatus being either a handheld handsfree use or a desktop handsfree use. When the determined use of the apparatus is the handheld handsfree use, the method may comprise selecting a front top microphone and a rear top microphone as the selected one or more second microphones; and when the determined use of the apparatus is the desktop handsfree use, the method may comprise selecting a front top microphone as the selected one or more second microphones. The determined orientations of the apparatus may comprise a portrait orientation and a landscape orientation, and the different types of sound capture features comprise two of more of: mono audio capture, mono zoom audio capture, stereo capture, directed stereo capture, surround capture and wind noise reduction.

An example embodiment may comprise a non-transitory program storage device such as memory 24 for example, readable by a machine 10, tangibly embodying a program of instructions executable by the machine for performing operations, the operations comprising, when an apparatus is in a voice phone call mode of sound capture, outputting a signal from a first microphone as a primary speech signal, and selecting one or more second microphones of the apparatus to output a noise reduction signal, where the apparatus comprises at least two of the second microphones, and where selection of the one or more second microphones is based at least partially upon a determined use of the apparatus being either a handportable use or an integrated handsfree use; and/or, when the apparatus is in a multi-media mode of sound capture, selecting one or more of the microphones to output audio signals based, at least partially, upon both a determined type of sound capture feature being used by the apparatus, where the apparatus comprises a plurality of different types of sound capture features, and based upon a determined orientation of the apparatus.

An example embodiment may comprise apparatus including at least one processor; and at least one non-transitory memory including computer program code, the at least one memory and the computer program code configured to, with the at least one processor, cause the apparatus at least to: when the apparatus is configured to transmit a sound source in a voice phone call mode, output at least one signal from at least one first microphone to the at least one processor as a primary speech signal, and output two or more signals from at least two or more second microphones to output a noise reduction signal to the at least one processor; and/or when the apparatus is configured to operate for sound capturing in a multi-media mode, output at least one signal from the same one or more of the first microphones, and two or more signals from the same at least two or more second microphones to the at least one processor.

An example method may comprise, when an apparatus is in a voice phone call mode, outputting a signal from at least one first microphone to the at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more first microphones, and two or more signals from the same at least two or more second microphones to the at least one processor.

An example embodiment may comprise a non-transitory program storage device readable by a machine, tangibly embodying a program of instructions executable by the machine for performing operations, the operations comprising when an apparatus is in a voice phone call mode, outputting a signal from at least one first microphone to at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more of the first microphones, and two or more signals from the same at least two or more second microphones to the at least one processor.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
at least three microphones suitably located in the apparatus so that each of the at least three microphones is configured to be used with the other ones of the microphones in at least two different apparatus modes, the at least two apparatus modes comprising a voice phone call mode and a multi-media mode;
at least one processor; and
at least one non-transitory memory including computer program code, the at least one memory and the computer program code configured to, with the at least one processor, cause the apparatus at least to:
determine that the apparatus is in at least one of the voice phone call mode and the multi-media mode;
in response to determining that the apparatus is in the voice phone call mode:
select at least three of the microphones to use in the voice phone call mode;
determine a use for each of the selected at least three microphones such that:
at least one first microphone of the selected at least three microphones is used for primary speech by outputting at least one signal to the at least one processor as a primary speech signal, and
at least one second microphone of the selected at least three microphones is used for noise reduction by outputting at least one signal as a noise reduction signal to the at least one processor; and
in response to determining that the apparatus is in the multi-media mode select the same at least three microphones to each output at least one signal to the at least one processor for sound capture, and determine a use for each of the selected at least three microphones for the multi-media mode based at least on a type of sound capture feature being used by the apparatus, where the apparatus comprises a plurality of different types of sound capture features based on the determined mode.

2. The apparatus as in claim 1, wherein the voice phone call mode of the apparatus is a hand portable call mode, and the apparatus is configured to select: a front bottom microphone, a rear bottom microphone and a rear top microphone as the selected at least three microphones.

3. The apparatus as in claim 1, wherein the voice phone call mode of the apparatus is an integrated handsfree call mode, and wherein selection of the at least three microphones is based at least partially upon a determined use of the apparatus being either a handheld handsfree use or a desktop handsfree use.

4. The apparatus as in claim 3, where when the determined use of the apparatus is either the desktop handsfree use or the handheld handsfree use, the selected at least three microphones comprise: a front bottom microphone, a rear bottom, and a rear top microphone.

5. The apparatus as in claim 3, the apparatus comprising at least four suitably located microphones, and where when the determined use of the apparatus is either the desktop handsfree use or the handheld handsfree use, the apparatus is configured to select at least one of the following groups of microphones as the at least one second microphone of the selected at least three microphones:
 a front top microphone, a rear top microphone and a front bottom microphone,
 a front bottom microphone, a rear bottom microphone and a front top microphone, and;
 a front bottom microphone, a rear bottom microphone and a rear top microphone.

6. The apparatus as in claim 1, wherein determining the use for each of the selected at least three microphones for the determined mode is based at least upon a determined orientation of the apparatus.

7. The apparatus as in claim 1, where the different types of sound capture features comprise two or more of: mono audio capture, mono zoom audio capture, stereo capture, directed stereo capture, surround capture and wind noise reduction.

8. The apparatus as in claim 7, where
 when the type of sound capture feature being used is mono audio capture, the apparatus is configured to use a rear top microphone,
 when the determined type of sound capture feature is mono zoom audio capture, and when a determined orientation of the apparatus is a portrait orientation, the apparatus is configured to use the rear top microphone and a front top microphone, or a rear bottom microphone and a front bottom microphone, and
 when the determined type of sound capture feature is mono zoom audio capture, and when the determined orientation is a landscape orientation, the apparatus is configured to use the rear top microphone and the front top microphone, and/or the rear bottom microphone and the front bottom microphone.

9. The apparatus as in claim 7 where,
 when the type of sound capture feature being used is stereo capture, and when a determined orientation of the apparatus is a landscape orientation, the apparatus is configured to use the rear top microphone and the rear bottom microphone.

10. The apparatus as in claim 9, where the apparatus comprises at least four suitably located microphones, and where
 when the type of sound capture feature being used is directional stereo capture, and when the determined orientation is the landscape orientation, the apparatus is configured to use the rear top microphone, the front top microphone, the rear bottom microphone and the front bottom microphone.

11. The apparatus as in claim 7, where when the determined type of sound capture feature is surround capture, and when a determined orientation of the apparatus is a landscape orientation, the apparatus is configured to select:
 a rear top microphone, a front top microphone and a rear bottom microphone as the selected at least three microphones, and/or
 the rear top microphone, the rear bottom microphone and a front bottom microphone as the selected at least three microphones.

12. The apparatus as in claim 7, where when the determined type of sound capture feature is wind noise reduction, and when a determined orientation of the apparatus is a landscape orientation, the apparatus is configured to switch the use of one or more of the selected at least three microphones based upon wind noise.

13. The apparatus as in claim 1, further comprising:
 a housing;
 at least one printed circuit board in the housing, where the at least one printed circuit board comprises the at least one processor and the at least one memory;
 at least one transmitter and at least one receiver connected to the at least one printed circuit board;
 an electronic display connected to the housing; and
 a battery connected to the at least one printed circuit board.

14. The apparatus as in claim 1, wherein a third microphone of the selected at least three microphones is used to form a beam with the primary speech signal.

15. The apparatus as in claim 14, wherein:
 when the apparatus is in the hand portable call mode the beam formed with the primary speech signal is a fixed beam; and
 when the apparatus is in the integrated handsfree call mode, the beam formed with the primary speech signal is a moving beam.

16. A method comprising:
 determining an apparatus is in at least one of a voice phone call mode and a multi-media mode, wherein the apparatus comprises at least three microphones suitably located in the apparatus so that each of the at least three microphones is configured to be used with the other ones of the microphones in at least two different apparatus modes;
 in response to determining that the apparatus is in the voice phone call mode:
  selecting at least three of the microphones to be used in the voice phone call mode;
  determining a use for each of the selected at least three microphones such that:
   at least one first microphone of the selected at least three microphones is used for primary speech by outputting at least one signal to the at least one processor as a primary speech signal, and
   at least one second microphone of the selected at least three microphones is used for noise reduction by outputting at least one signal as a noise reduction signal to the at least one processor; and
 in response to determining that the apparatus is in a multi-media mode, select the same at least three microphones to each output at least one signal to the at least one processor for sound capture and determining a use for each of the selected at least three microphones for the multi-media mode based at least on a type of sound capture feature being used by the apparatus, where the apparatus comprises a plurality of different types of sound capture features based on the determined mode.

17. The method as in claim 16, wherein the voice phone call mode of the apparatus is a hand portable call mode, the selecting comprises:

selecting a front bottom microphone, a rear bottom microphone and a rear top microphone as the selected at least three microphones.

18. The method as in claim 16, wherein the voice phone call mode of the apparatus is an integrated handsfree call mode, and wherein selecting the at least three microphones is based at least partially upon a determined use of the apparatus being either a handheld handsfree use or a desktop handsfree use.

19. The method as in claim 18, where
when the determined use of the apparatus is either the handheld handsfree use or the desktop handsfree use, the selecting comprises: selecting a front bottom microphone, a rear bottom microphone, and a rear top microphone as the selected at least three microphones.

20. The method as in claim 16, wherein determining the use for each of the selected at least three microphones is based at based at least partially on an orientation of the apparatus at which the determined mode utilizes each of the selected at least three microphones in accordance with the orientation of the apparatus.

21. The method as in claim 20, where the determined orientation of the apparatus comprises either a portrait orientation or a landscape orientation, and where the plurality of different types of sound capture features comprise two or more of: mono audio capture, mono zoom audio capture, stereo capture, directed stereo capture, surround capture and wind noise reduction.

* * * * *